(12) United States Patent
Ganzenmuller

(10) Patent No.: US 6,813,805 B2
(45) Date of Patent: Nov. 9, 2004

(54) IN VEHICLE VACUUM SYSTEM

(76) Inventor: William Ganzenmuller, 3408 Seneca Ave., Chesapeake, VA (US) 23325

( * ) Notice: Subject to any disclaimer, the term of this patent is extended or adjusted under 35 U.S.C. 154(b) by 0 days.

(21) Appl. No.: 10/279,112

(22) Filed: Oct. 24, 2002

(65) Prior Publication Data
US 2003/0037401 A1 Feb. 27, 2003

Related U.S. Application Data

(63) Continuation of application No. 09/955,590, filed on Sep. 17, 2001, now Pat. No. 6,490,751
(60) Provisional application No. 60/233,100, filed on Sep. 15, 2000.

(51) Int. Cl.[7] ............................................. B60S 1/64
(52) U.S. Cl. ............................................ 15/313; 15/330
(58) Field of Search ......................... 15/313, 339, 405, 15/330

(56) References Cited

U.S. PATENT DOCUMENTS

| | | | |
|---|---|---|---|
| 3,431,581 A | * | 3/1969 | Booth .......................... 15/313 |
| 3,449,787 A | * | 6/1969 | Rothstein et al. .............. 15/313 |
| 4,325,163 A | | 4/1982 | Mattson et al. |
| 4,829,626 A | | 5/1989 | Harkonen et al. |
| 4,899,418 A | | 2/1990 | Steiner et al. |
| 4,991,253 A | | 2/1991 | Rechsteiner |
| 5,084,937 A | | 2/1992 | Hague |
| 5,189,753 A | * | 3/1993 | Sousa et al. ................... 15/313 |
| 5,239,727 A | | 8/1993 | Roestenberg |
| 5,274,878 A | | 1/1994 | Radabaugh et al. |
| 5,511,281 A | | 4/1996 | Webster |
| 5,522,115 A | | 6/1996 | Webster et al. |
| 5,604,954 A | | 2/1997 | Webster et al. |
| 5,659,920 A | | 8/1997 | Webster et al. |
| 5,673,457 A | | 10/1997 | Webster et al. |
| 5,701,632 A | | 12/1997 | Webster et al. |
| D400,322 S | | 10/1998 | Webster et al. |
| 5,829,091 A | * | 11/1998 | Ingram et al. ................. 15/313 |
| D405,566 S | | 2/1999 | Webster et al. |
| RE36,627 E | | 3/2000 | Pink et al. |
| 6,128,804 A | * | 10/2000 | Lee et al. ...................... 15/313 |
| 6,148,472 A | * | 11/2000 | Arena ........................... 15/313 |
| 6,490,751 B2 | * | 12/2002 | Ganzenmuller ............... 15/313 |

* cited by examiner

Primary Examiner—Terrence R. Till
(74) Attorney, Agent, or Firm—Neil F. Markva

(57) ABSTRACT

The present invention relates to a vacuum cleaning system and more particularly pertains to a direct port vacuum cleaning system for use in a motor vehicle anytime or anywhere. The system comprises a vacuum generating unit and a vacuum cleaner hose. The vacuum generating unit comprises an electric motor, an impeller and a removable debris canister. The removable debris canister contains a vacuum cleaner hose attachment end and is directly connected to the vacuum cleaner hose. The vacuum generating unit also contains a vacuum exhaust port, located at the opposite end of the vacuum generating unit from the vacuum cleaner hose attachment end. The vacuum generating unit is powered by the vehicle's battery. The battery's power is converted from DC to AC by power inversion means.

21 Claims, 4 Drawing Sheets

IN VEHICLE VACUUM SYSTEM

RELATED APPLICATIONS

Pursuant to 35 U.S.C. § 119, the benefit of priority from U.S. provisional application Ser. No. 60/233,100 having a filing date of Sep. 15, 2000, is claimed for the U.S. non-provisional application Ser. No. 09/955,590 filed Sep. 17, 2001. This application is a continuation of U.S. non-provisional application Ser. No. 09/955,590 filed Sep. 17, 2001, which is now U.S. Pat. No. 6,490,751.

BACKGROUND OF THE INVENTION

1. Field of the Invention

The present invention relates to a vacuum cleaning system and more particularly pertains to a direct port vacuum cleaning system for use in a motor vehicle anytime or anywhere.

2. Description of the Prior Art

The use of vacuum cleaning systems is known in the prior art. Various vacuum cleaning systems are described in U.S. Pat. No. 5,829,091; U.S. Pat. No. 5,189,753; U.S. Pat. No. 4,829,626; U.S. Pat. No. 5,274,878; U.S. Pat. No. 5,239,727; and U.S. Pat. No. 4,991,253.

While these devices fulfill their respective, particular objectives and requirements, the aforementioned patents do not disclose an in-vehicle, direct port vacuum cleaning system. Particularly, U.S. Pat. No. 5,829,091 describes a central vacuum cleaning system. It requires a vacuum port including a vacuum line located within the panels of the automobile. The vacuum line is difficult to assemble and replace. It is also decreases the suction power of the vacuum.

The present device comprises a direct port vacuum. It does not require piping throughout the vehicle, therefore, it is easily installed and readily removed. In these respects, the in-vehicle, direct port, vacuum system according to the present invention substantially departs from the conventional concepts and designs of the existing art, and in so doing provides an apparatus primarily developed for the purpose of providing the opportunity to vacuum an automobile anytime or anywhere.

SUMMARY OF THE INVENTION

In view of the foregoing disadvantages inherent in the known types of vacuum cleaning systems now present, the instant invention provides an in-vehicle, direct port, vacuum cleaning system which is operated from a vehicle battery and can be used while the vehicle is in use.

The general purpose of the present invention is to provide an in-vehicle, direct port, vacuum cleaning apparatus and method which has many of the advantages of the vacuum cleaning systems mentioned heretofore and many novel features that result in a system which is not anticipated, rendered obvious, suggested, or even implied by any other vacuum cleaning systems, either alone or in any combination thereof.

To attain this, the present invention generally comprises a vacuum generating unit and a direct port vacuum cleaner hose. The vacuum generating unit is powered by the vehicle's battery via power inversion means and runs on 110 volts of power.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide an in-vehicle, direct port, vacuum cleaning system which has many of the advantages of the vacuum cleaning systems mentioned heretofore and many novel features that result in a system which is not anticipated, rendered obvious, suggested, or even implied by any of the prior art vacuum cleaning systems, either alone or in any combination thereof.

It is another object of the present invention to provide an in-vehicle, direct port, vacuum cleaning system which may be easily and efficiently installed and removed.

Still another object of the present invention is to provide an in-vehicle, direct port, vacuum cleaning system for providing the opportunity to vacuum a vehicle anytime or anywhere. Still another object of the present invention is to provide an in-vehicle, direct port, vacuum cleaning system that does not require a vacuum line throughout the vehicle.

Yet another object of the present invention is to provide an in-vehicle, direct port, vacuum cleaning system that can be used to blow dry hair, blow up flat tires, blow off debris from the driveway and the like.

Yet another object of the present invention is to provide an in-vehicle, direct port, vacuum cleaning system that is powered by the vehicle's battery via power inversion means.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
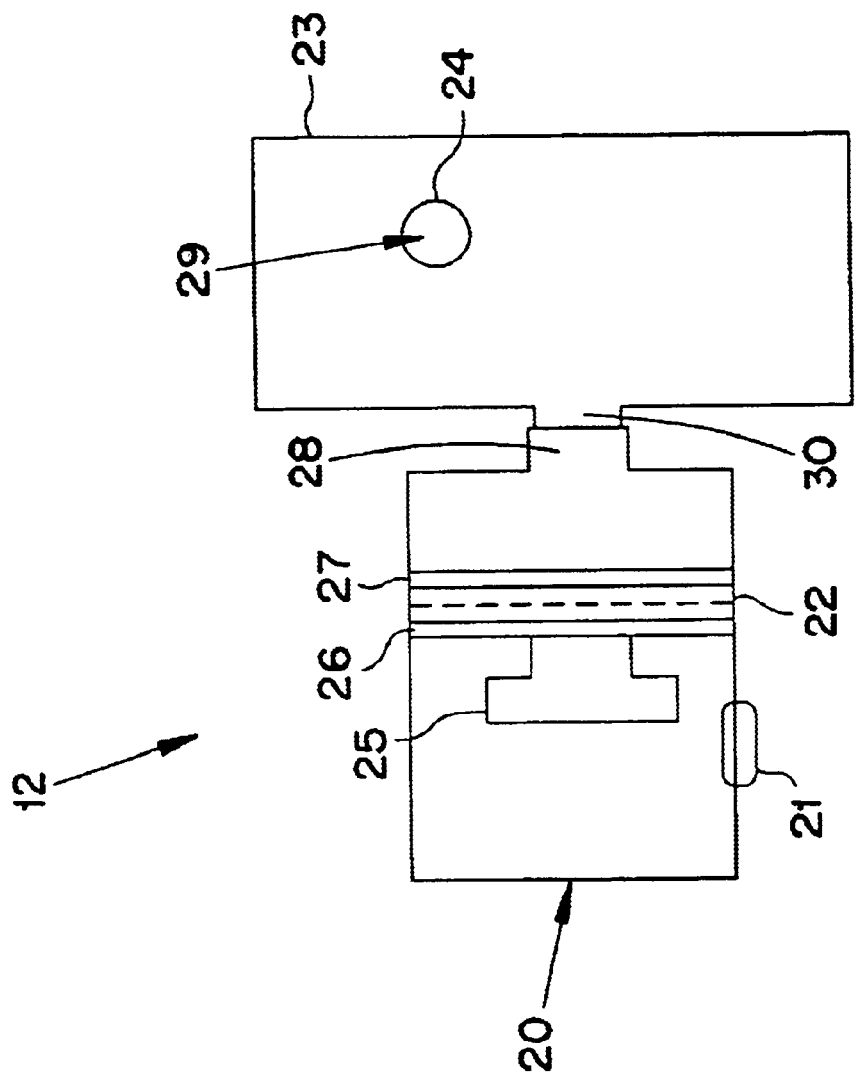
FIG. 2 is an enlarged detail of the vacuum generating unit, front side.

The present invention comprises a vacuum generating unit 12 and a vacuum cleaner hose. As shown in FIG. 2, the vacuum generating unit 12 comprises an electric motor 25, an impeller 22 and a removable debris canister 23. The removable debris canister 23 contains a vacuum cleaner hose attachment end 24 and is directly connected to the vacuum cleaner hose via its vacuum cleaner hose attachment end 24. The vacuum generating unit 12 also contains an vacuum exhaust port 21, located at the opposite end of the vacuum generating unit from the vacuum cleaner hose attachment end 24, as shown in FIG. 2.

As is evident in the originally filed drawings, the direct port vacuum cleaning system is for use within a vehicle having a battery. The cleaning system comprises vacuum generating means including blower means within blower housing 20, and debris canister means having debris canister housing 23 detachably mounted directly to blower housing 20. The blower means includes rotatably mounted impeller 22, and electric motor means 25 for rotating impeller 22 within blower housing 20. Electric power coupling means electrically connects electric motor means 25 to vehicle battery 10 to rotate the impeller. Blower housing 20 includes air inlet means 28 and air exhaust port 21 that direct a flow of air from blower air inlet means 28 and out air exhaust port 21 when impeller 22 is rotated within the blower housing. Debris canister housing 23 includes canister air input means, generally designated 29, and canister air outlet means 30 detachably mounted directly to air inlet means 28 of blower housing 20 to provide a defined path for the flow of air through the system. Canister air input means 29 receives the input flow of air mixed with captured debris into debris canister housing 23 when mounted to blower air inlet means 28, and impeller 22 rotates within housing 20 and thus produces the flow of air. Therefore, canister housing 23 is necessarily composed of rigid, air impermeable material to direct the flow of air through the direct port vacuum system. Canister air input means 29 is effective to separate debris from the air input mixture received into canister housing 23, and is further effective to direct the flow of air along the defined air path into and out of debris canister 23 into blower housing 20 directly from canister outlet means 30 through air inlet means 28 and out blower exhaust means 21 when impeller 22 is rotated.

Figure 3:
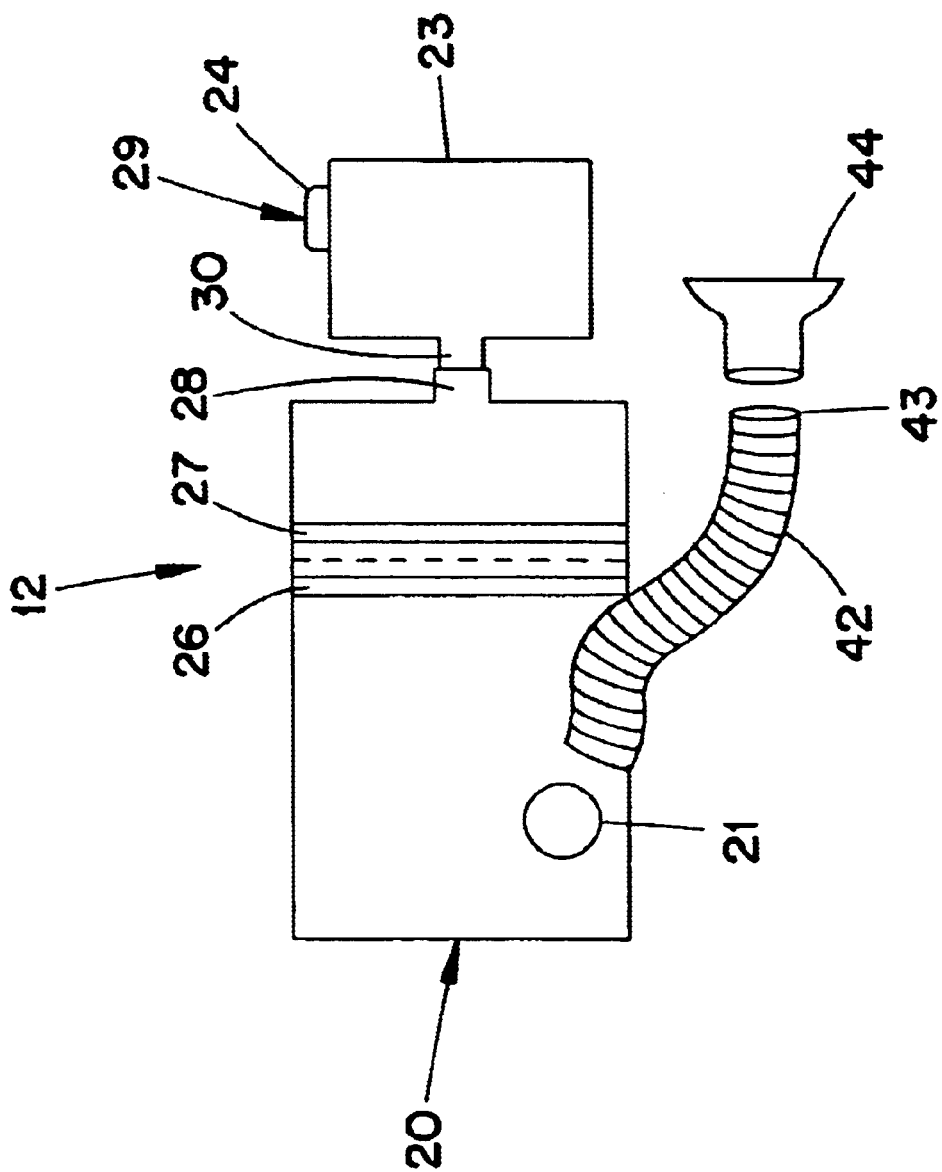
FIG. 3 is an enlarged detail of the vacuum generating unit, bottom side.

In the specific embodiment of the drawings, canister air input means 29 includes means for removably connecting debris canister housing 23 to vacuum hose 42 as shown in FIG. 3. Canister air input means 29 receives the input mixture of air and debris into canister housing 23 in a direction pointing away from canister air outlet means 30 to divert and separate the captured debris from air in the input mixture. So the flow of air is directed along defined air path out of canister air outlet means 30 directly into blower housing 20 without carrying debris that is collected in canister housing 23. Baffle means 31 diverts debris from the input flow of air/debris mixture, and includes a downwardly curved extension section of canister air input means 29 as shown to direct the captured debris to a bottom position of canister housing 23. As is further evident, canister housing 23 has a vertically disposed longitudinal axis extending between a top end and a bottom end of canister housing 23. Canister air outlet means 30 is located at a first intermediate location between its top and bottom ends with canister air input means 29 being located at a second intermediate location between the top and bottom ends. As shown, the first intermediate location is closer to the canister bottom end than its top end, and the second intermediate location is closer to the canister top end than its bottom end. Moreover, canister air input means 29 is effective to receive the flow of input air/debris mixture into canister housing 23 along a first direction that extends through the canister longitudinal axis, and canister air outlet means 30 is effective to discharge air from canister housing 23 along a second direction that extends through its longitudinal axis. The first and second directions are further disposed at an angle with respect to each other to enhance diversion of the captured debris from the input air/debris mixture. In this specific embodiment, the first and second directions are disposed at an angle of about 90° with respect to each other.

Figure 1:
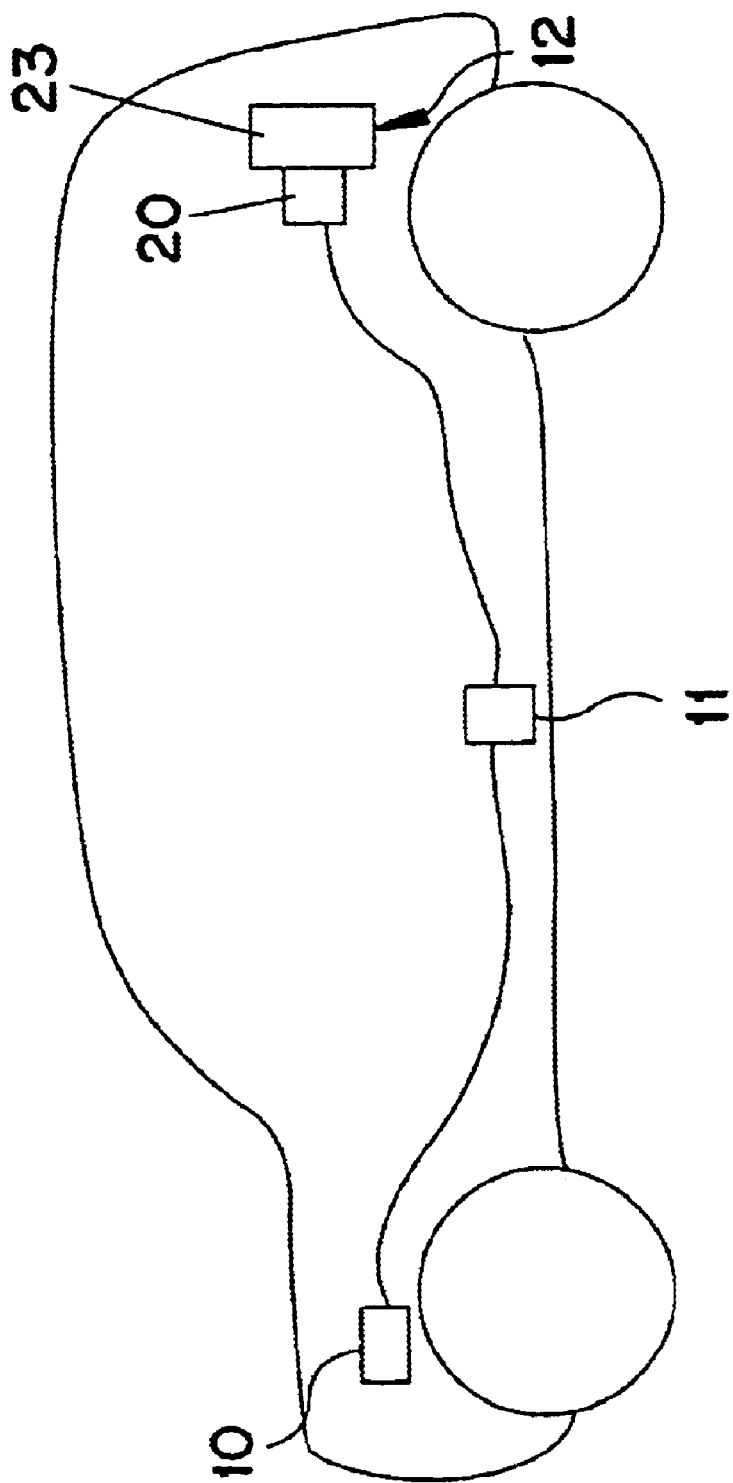
FIG. 1 is a side view of the in-vehicle, direct port vacuum cleaning system installed in a vehicle according to the present invention.

Referring now to FIG. 1, the vacuum generating unit 12 is powered by the vehicle's battery 10. The battery's power is converted from DC to AC by power inversion means 11. Power inversion means 11 include, but are not limited to, a power inverter, a computer chip, a fuse, or a fusible link. In a preferred embodiment, the vacuum generating unit's electric motor 25 is run on 110 volt power. Power is controlled by a remote power switch located conveniently within the vehicle. Wiring connects the power inversion means to the vacuum generating unit 12, providing zero to approximately 1,000 watts of power to the system. In addition to the system operating while the engine is on, it can also run for some time after the engine has been turned off. In a preferred embodiment, an indicator light notifies the user that it is time to start the vehicle. Also, if the power source is draining too much power, the system automatically shuts down to let the user know to start the engine.

Figure 4:
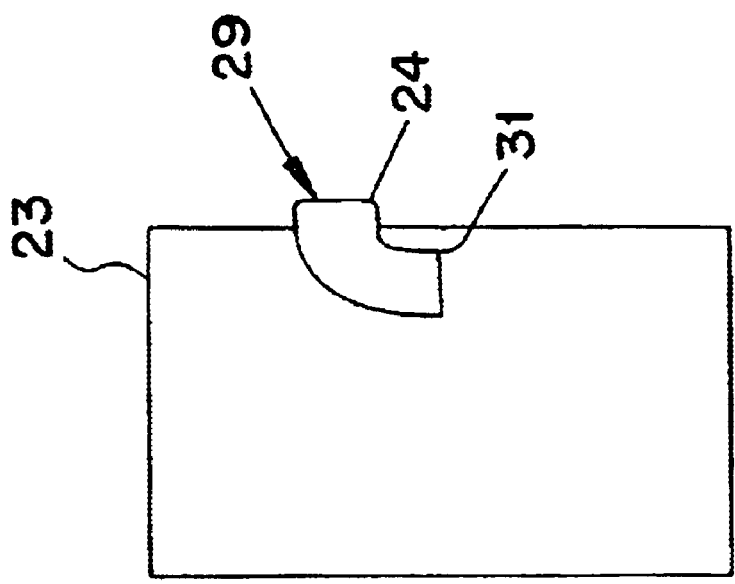
FIG. 4 is a cross section of the debris canister.

The vacuum hose is directly and detachably connected to the debris canister 23. There is direct port intake of debris into the debris canister 23. As shown in FIG. 4, baffle means 31 provides for the debris to be diverted to the bottom of the debris canister 23. Debris may include both solid and liquid waste. In a preferred embodiment, baffle means 31 is a downward, interior, curved extension of the vacuum cleaner hose attachment end 24. The debris canister is easily detached and emptied. It is connected to the rest of the vacuum generating unit by conventional means.

In a preferred embodiment, a hose 42 is connected to the vacuum exhaust port 21, to permit the vacuum cleaning system to function as a blower. In a preferred embodiment, as shown in FIG. 3, the vacuum exhaust port 21 is located on the bottom of the vacuum generating unit 12. Attachments 44 are connected to the hose 42, thus permitting blow, drying hair 44, blowing sand off kids or dogs, blowing dirt and dust off tools, blowing up inner-tubes, rafts, rubber boats, blowing up flat tires and the like. Any old and well known attachment tools of those commonly used with blowers may be used with the present invention.

The vacuum generating unit is located within the vehicle. In a preferred embodiment, as shown in FIG. 1, the vacuum generating unit 12 and hose are located in the back side panel of the an automobile or the back cab of a sport utility vehicle. Dimensions of the vacuum generating unit 12 may vary, depending on the space available and according to the needs of the user. In a preferred embodiment, the vacuum generating unit 12 has a vertical measurement of approximately twelve to fourteen inches and a horizontal measurement of approximately eight to twelve inches. The general appearance of the system is in the shape of perpendicular rectangles. The debris canister 23 is a horizontal rectangle, whereas, the rest of the unit is vertical. As shown in FIG. 2, the impeller is encased by a front 27 and back mounting 26. The mounting and positioning of the impeller 22 and motor 25 prevent contact with debris.

The vacuum cleaner hose comprises a flexible vacuum hose 42 with a vacuum port attachments end and an attachment tool end. The flexible vacuum hose may be of the expandable and retractable type and may be stored in the vehicle. A vacuum cleaner hose attachments tool 44 may be attached to the attachments tool end 43 of the vacuum cleaner hose. Any old and well known attachments tools of those commonly used with vacuum cleaners may be used with the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A direct port vacuum cleaning system for use within a vehicle having a battery, said cleaning system comprising:
   a) vacuum generating means including blower means within a blower housing, and debris canister means having canister housing means composed of rigid, air impermeable material and detachably mounted directly to the blower housing for providing a defined path for a flow of air through the system,
   b) said blower means including rotatably mounted impeller means, and electric motor means for rotating the impeller means within the blower housing, and
   c) electric power coupling means for electrically connecting said electric motor means to said vehicle battery to rotate said impeller means,
   d) said blower housing including air inlet means and air exhaust means for directing said flow of air from the air inlet means and out the air exhaust means of the blower housing when the impeller means is rotated within said blower housing,
   e) said debris canister housing means including canister air input means and air outlet means for directing said flow of air along said defined path into and out of the debris canister housing means into the blower housing when said canister air outlet means is detachably mounted directly to said air inlet means of the blower housing, said canister air input means for receiving an input mixture of air and debris into said debris canister housing means when the canister means is mounted directly to the blower housing and the impeller means is rotated within said blower housing,
   f) said canister air input means being effective to separate said debris from said air input mixture received into the canister housing means, and being further effective to direct said flow of air from said canister housing means along said defined air path directly into the air inlet means and out the air exhaust means of the blower housing when said impeller means is rotated.

2. The direct port vacuum cleaning system as defined in claim 1 wherein
   said electric power coupling means includes power inversion means connected to said battery.

3. The direct port vacuum cleaning system as defined in claim 2 wherein
   said power inversion means is selected from the group consisting of a power inverter, a computer chip, a fuse, or a fusible link.

4. The direct port vacuum cleaning system as defined in claim 2 wherein
   said power inversion means supplies 110 volts to said electric motor means.

5. The direct port vacuum cleaning system as defined in claim 2 wherein
   said power inversion means is a power inverter.

6. The direct port vacuum cleaning system as defined in claim 1 wherein
   said debris canister means is capable of containing liquid and solid debris.

7. The direct port vacuum cleaning system as defined in claim 1 wherein
   said canister air input means includes means for removably connecting a vacuum hose attachment to the air input means of said debris canister means.

8. The direct port vacuum cleaning system as defined in claim 1 wherein
   said canister air input means receives said input mixture into said debris canister housing means in a direction pointing away from the canister air outlet means for diverting and separating the captured debris from the flow of air so said flow of air goes out said canister air outlet means without carrying debris along with the flow of air moving through said blower housing.

9. The direct port vacuum cleaning system as defined in claim 1 wherein
   said canister air input means includes baffle means for diverting and separating the captured debris from the flow of air so said flow of air goes out said canister air outlet means without carrying debris along with the flow of air moving through said blower housing.

10. The direct port vacuum cleaning system as defined in claim 1 wherein
    said canister air input means includes means for diverting said debris from said flow of air to separate the captured debris from the flow of air in said input mixture so that said flow of air goes out said canister air outlet means without carrying debris into the flow of air moving through said blower housing.

11. The direct port vacuum cleaning system as defined in claim 10 wherein
    said means for diverting the debris from said flow of air includes a downwardly curved extension section of the canister air input means to direct the captured debris to a bottom portion of the canister housing means.

12. The direct port vacuum cleaning system as defined in claim 1 wherein
    said canister housing means has a vertically disposed longitudinal axis extending between a top end and a bottom end of the canister housing means, and
    the canister air outlet means is located at a first intermediate location between said top and bottom ends, and the canister air input means is located at a second intermediate location between the top and bottom ends with the first intermediate location being closer to the bottom end than the top end, and the second intermediate location being closer to the top end than the bottom end of the canister housing means.

13. The direct port vacuum cleaning system as defined in claim 12 wherein
    the canister air input means is effective to receive said flow of air mixed with debris into said canister housing means along a first direction that extends through said longitudinal axis, and the canister air outlet means is effective to discharge air from the canister housing means along a second direction that extends through said longitudinal axis,
    said first and second directions being disposed at an angle with respect to each other to enhance diversion of the captured debris from said input mixture.

14. The direct port vacuum cleaning system as defined in claim 13 wherein said first and second directions are disposed at an angle of about 90° with respect to each other.

15. A direct port vacuum cleaning system for use within a vehicle having a battery, said cleaning system comprising:

a) vacuum generating means including blower means within a blower housing, and debris canister means having canister housing means detachably directly connected to the blower housing for providing a defined path for a flow of air through the system, b) said blower means including rotatably mounted impeller means, and electric motor means for rotating the impeller means within the blower housing, and c) electric power coupling means for electrically connecting said electric motor means to said vehicle battery to rotate said impeller means, d) said blower housing including air inlet means and air exhaust means for directing a flow of air from the air inlet means and out the air exhaust means of the blower housing when the impeller means is rotated within said blower housing, e) said debris canister housing means including canister air input means and canister air outlet means for directing said flow of air along said defined path into and out of the debris canister housing means and out the canister air outlet means into the blower housing when the canister air outlet means is detachably connected directly to said air inlet means of the blower housing, said canister air input means being effective to receive an input mixture of air and debris into said debris canister housing means when the canister means is connected directly to the blower housing and the impeller means is rotated within said blower housing, f) said canister air input means includes means for diverting said debris from said flow of air to separate the captured debris from the flow of air in said input mixture so that said flow of air goes out said canister air outlet means without carrying debris into the flow of air moving through said blower housing.

16. A direct port vacuum cleaning system as defined in claim 15 wherein said means for diverting said debris comprises baffle means.

17. The direct port vacuum cleaning system as defined in claim 15 wherein said means for diverting the debris from said flow of air includes a downwardly curved extension section of the canister air input means to direct the captured debris to a bottom portion of the canister housing means.

18. A direct port vacuum cleaning system for use within a vehicle having a battery, said cleaning system comprising:

a) vacuum generating means including blower means within a blower housing, and debris canister means having canister housing means detachably directly connected to the blower housing for providing a defined path for a flow of air through the system, b) said blower means including rotatably mounted impeller means, and electric motor means for rotating the impeller means within the blower housing, and c) electric power coupling means for electrically connecting said electric motor means to said vehicle battery to rotate said impeller means, d) said blower housing including air inlet means and air exhaust means for directing a flow of air from the air inlet means and out the air exhaust means of the blower housing when the impeller means is rotated within said blower housing, e) said debris canister housing means including canister air input means and canister air outlet means for directing said flow of air along said defined path into and out of the debris canister housing means and out the canister air outlet means into the blower housing when the canister air outlet means is detachably connected directly to said air inlet means of the blower housing, said canister air input means being effective to receive an input mixture of air and debris into said debris canister housing means when the canister means is connected directly to the blower housing and the impeller means is rotated within said blower housing, f) said canister air input means receives said input mixture into said debris canister housing means in a direction pointing away from the canister air outlet means for diverting and separating the captured debris from the flow of air so said flow of air goes out said canister air outlet means without carrying debris along with the flow of air moving through said blower housing.

19. The direct port vacuum cleaning system as defined in claim 18 wherein said canister housing means has a vertically disposed longitudinal axis extending between a top end and a bottom end of the canister housing means, and the canister air outlet means is located at a first intermediate location between said top and bottom ends, and the canister air input means is located at a second intermediate location between the top and bottom ends with the first intermediate location being closer to the bottom end than the top end, and the second intermediate location being closer to the top end than the bottom end of the canister housing means.

20. The direct port vacuum cleaning system as defined in claim 19 wherein the canister air input means is effective to receive said flow of air mixed with debris into said canister housing means along a first direction that extends through said longitudinal axis, and the canister air outlet means is effective to discharge air from the canister housing means along a second direction that extends through said longitudinal axis, said first and second directions being disposed at an angle with respect to each other to enhance diversion of the captured debris from said input mixture.

21. The direct port vacuum cleaning system as defined in claim 20 wherein said first and second directions are disposed at an angle of about 90° with respect to each other.

* * * * *